H. W. KING.
DEPTH INDICATING DEVICE.
APPLICATION FILED MAY 17, 1919.

1,419,387.
Patented June 13, 1922.

Inventor
Horace W. King
By Whittemore Hulbert & Whittemore
Attorneys

UNITED STATES PATENT OFFICE.

HORACE W. KING, OF ANN ARBOR, MICHIGAN.

DEPTH-INDICATING DEVICE.

1,419,387.   Specification of Letters Patent.   Patented June 13, 1922.

Application filed May 17, 1919. Serial No. 297,807.

*To all whom it may concern:*

Be it known that I, HORACE W. KING, a citizen of the United States of America, residing at Ann Arbor, in the county of Washtenaw and State of Michigan, have invented certain new and useful Improvements in Depth-Indicating Devices, of which the following is a specification, reference being had therein to the accompanying drawings.

The invention relates to devices for indicating the depths of liquids and refers particularly to devices for indicating the depths of volatile liquids.

In the past, in the manufacture of depth measuring devices having an air chamber in communication with a volatile liquid, the vapor from the volatile liquid has a tendency to mix with the air in the air chamber, thereby increasing the pressure within the air chamber and forcing a portion of the air out of the chamber and into the tank containing the volatile liquid. When the air temperature drops, a portion of this vapor condenses and as a consequence the amount of air mixed with vapor in the air chamber is reduced, thereby causing the elevation of the surface of the volatile liquid within the air chamber to rise beyond where it should be. This introduces a comparatively large error in the readings upon the indicating gage, especially when there is a large variation in the temperature of the air.

My construction overcomes this objectionable feature and furthermore is simple and operates to substantially accurately measure the depth of a liquid.

Figure 1:
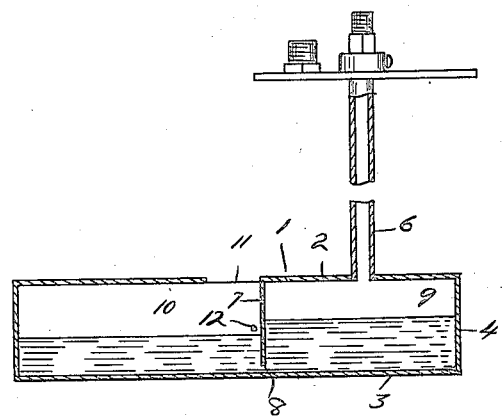
Figure 1 is a vertical cross-section of a device embodying my invention.
Figure 2:
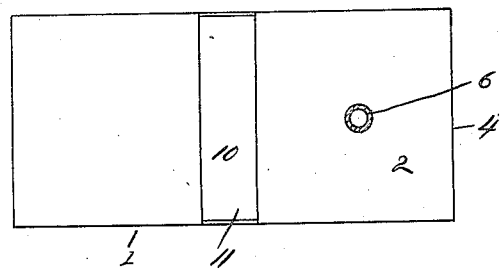
Figure 2 is a top plan view thereof.
Figure 3:
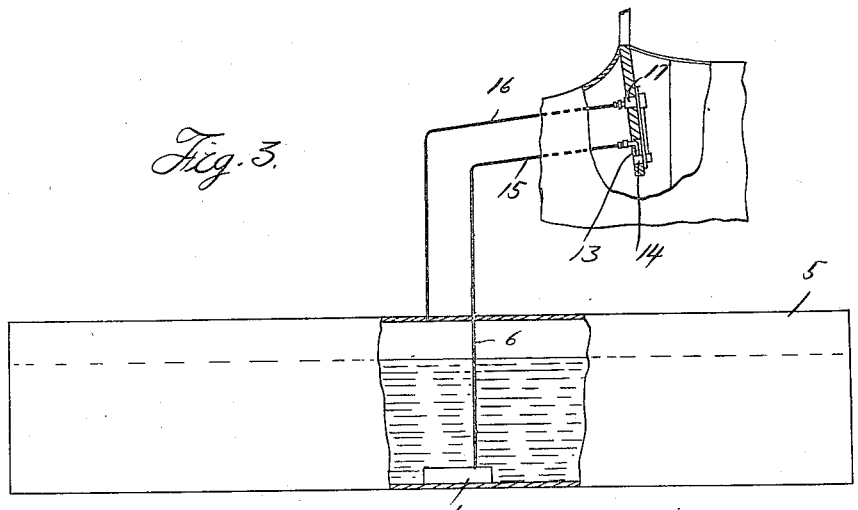
Figure 3 is a diagrammatic view showing the device attached to the gasoline tank of an automobile.

My depth measuring device has a number of uses, such as measuring the depths of natural bodies of water, of liquids held in containers, and the draught of floating objects; but, as shown in the present instance, the device is used for measuring the depth of volatile liquids such as gasoline in tanks upon automobiles. In order that my device may operate substantially accurately, it is necessary; first, that the area of a horizontal section of the air chamber, which is immersed in the gasoline, be many times greater than the inner cross-sectional area of the pressure tube or connection between the air chamber and the indicating gage; second, that the height of the air chamber be relatively small as compared to the depth of the gasoline being measured; and third, that means be provided between the air in the air chamber and the gasoline for preventing vapor from the gasoline mixing with the air.

1 is a receptacle, in the present instance of rectangular horizontal cross-section. This receptacle has a parallel top and bottom 2 and 3 and vertical sides 4. This receptacle is located in the gasoline tank 5 of an automobile and preferably at the bottom thereof, and is held in place by means of the rigid pipe 6 secured to the receptacle and attached to the top of the tank 5. 7 is a partition extending transversely of the receptacle 1 and from the top 2 to adjacent the bottom 3 thereof and forming the slot 8. The joints between the sides 4 and the top 2 and the partition 7 are air tight. This partition forms the chambers 9 and 10, the chamber 9 communicating with the rigid pipe 6 and the chamber 10 communicating with the gasoline through the aperture 11 formed in its top and also through the hole 12.

The chamber 9 is an air chamber and the vertical distance between the top and bottom 3 is small as compared with the depth of the gasoline in the tank 5 when the latter is full, the smaller the percentage of this distance to this depth the greater the relative accuracy. The area of the horizontal cross-section of this air chamber 9 is large in comparison with the cross-sectional area of the pipe 6, the larger the ratio of these areas the greater the accuracy of the device. Due to the relatively small height and the relatively large cross sectional area of the air chamber there are only slight differences in height of the liquid in the air chamber under varying depths of the liquid being measured.

The chambers 9 and 10 contain a non-volatile liquid which is non-miscible with and must be of greater density than the gasoline being measured, such as glycerin. This non-volatile liquid is poured into the receptacle 1 through the aperture 11 in the compartment 10 and enters into the air chamber 9 through the slot 8. A small aperture 12 is provided in the side of the compartment 10 for limiting the height of the non-volatile liquid in the receptacle. The hole 12 also allows the chamber 10 to communicate with the gasoline when the surface of the gasoline is below the top 2. This lowers the depth of the gasoline to be measured to a point below where it would otherwise be possible. The level of this non-volatile liquid is the same upon both sides of the partition 7 before the receptacle is installed in the gasoline tank 5.

This non-volatile liquid traps air in the air chamber 9 when the receptacle is placed in the tank 5 with its top and bottom substantially horizontal. The air in this chamber communicates with the leg 13 of a U-shaped pressure gage 14 through the rigid pipe 6 and the flexible tube 15, which latter has an internal cross-sectional area of substantially the same size as that of the pipe 6.

In the event that the depth of gasoline under pressure other than atmosphere is to be measured, a tube 16 must be provided which connects the top of the gasoline tank 5 with the other leg 17 of the U-shaped gage 14.

In operation, the non-miscible non-volatile liquid preferably heavier than gasoline is poured into the receptacle 1 until it reaches the aperture 12 in the receptacle. This receptacle is then placed in the gasoline tank 5 with its top and bottom approximately horizontal. Gasoline enters the compartment 10 through the aperture 11 and hole 12 and the pressure of the gasoline is transferred to the surface of the non-volatile liquid and then to the air in the air chamber 9. After the air in this chamber and tubes 6 and 15 become sufficiently compressed, the non-volatile liquid rises to a level in the air chamber slightly above its previous level when the pressure of the air balances the weight of the gasoline and is approximately equal to it. A measure of this pressure reduced to proper units, as by graduations upon the pressure gage, indicates the depth of the gasoline being measured.

What I claim as my invention is:

1. In a device for indicating the depth of a liquid, the combination with a receptacle within said liquid provided with two compartments in communication with each other near the bottom of said receptacle, said compartments containing a non-volatile liquid non-miscible with and of greater density than the liquid being measured, one of the compartments provided with an opening above the level of the non-volatile liquid therein for communicating with the liquid being measured, and the other of the compartments forming an air chamber, of a pressure gage, and a pipe connection between said gage and air chamber.

2. In a device for indicating the depth of a liquid, the combination with a receptacle within the liquid and having a partition therein extending from the top to near the bottom thereof to form a pair of communicating compartments, said compartments containing a non-volatile liquid of greater density than the liquid being measured, of a pressure gage, a pipe connection between said pressure gage and one of said compartments, said pipe connection connecting with said compartment in its upper wall, and the other of said compartments having an opening therein above the level of said non-volatile liquid.

In testimony whereof I affix my signature.

HORACE W. KING.